United States Patent Office 3,494,450
Patented Feb. 10, 1970

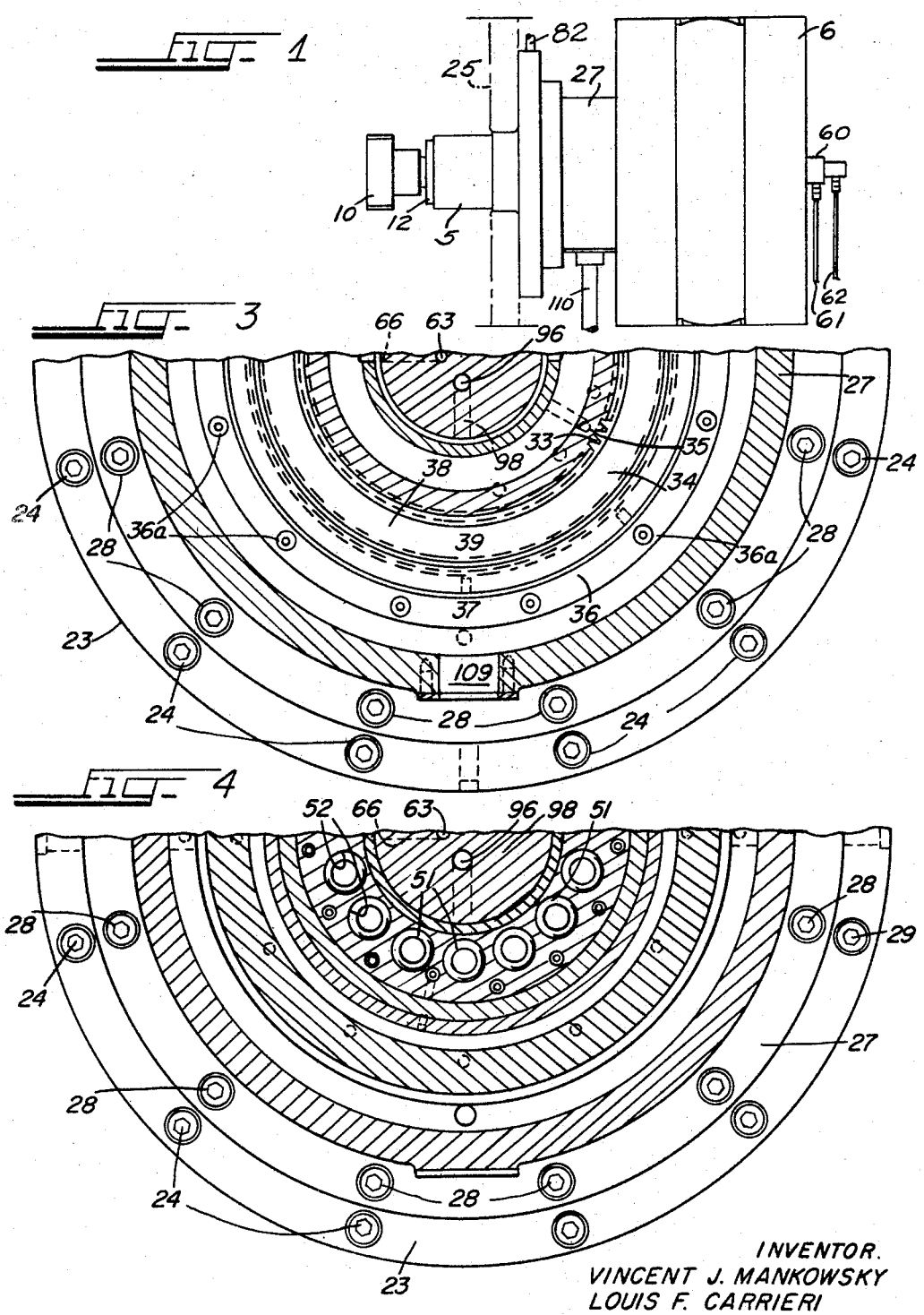

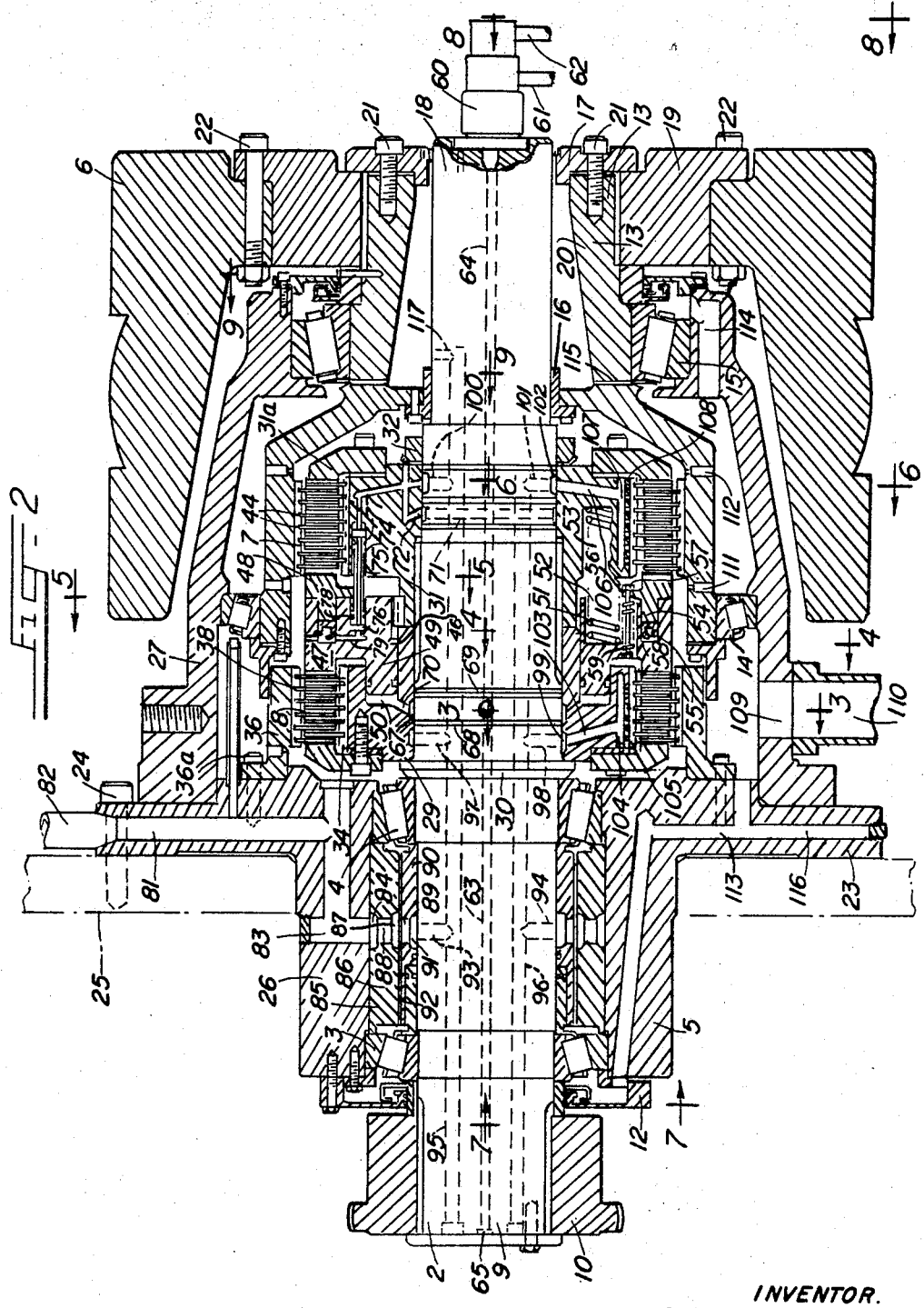

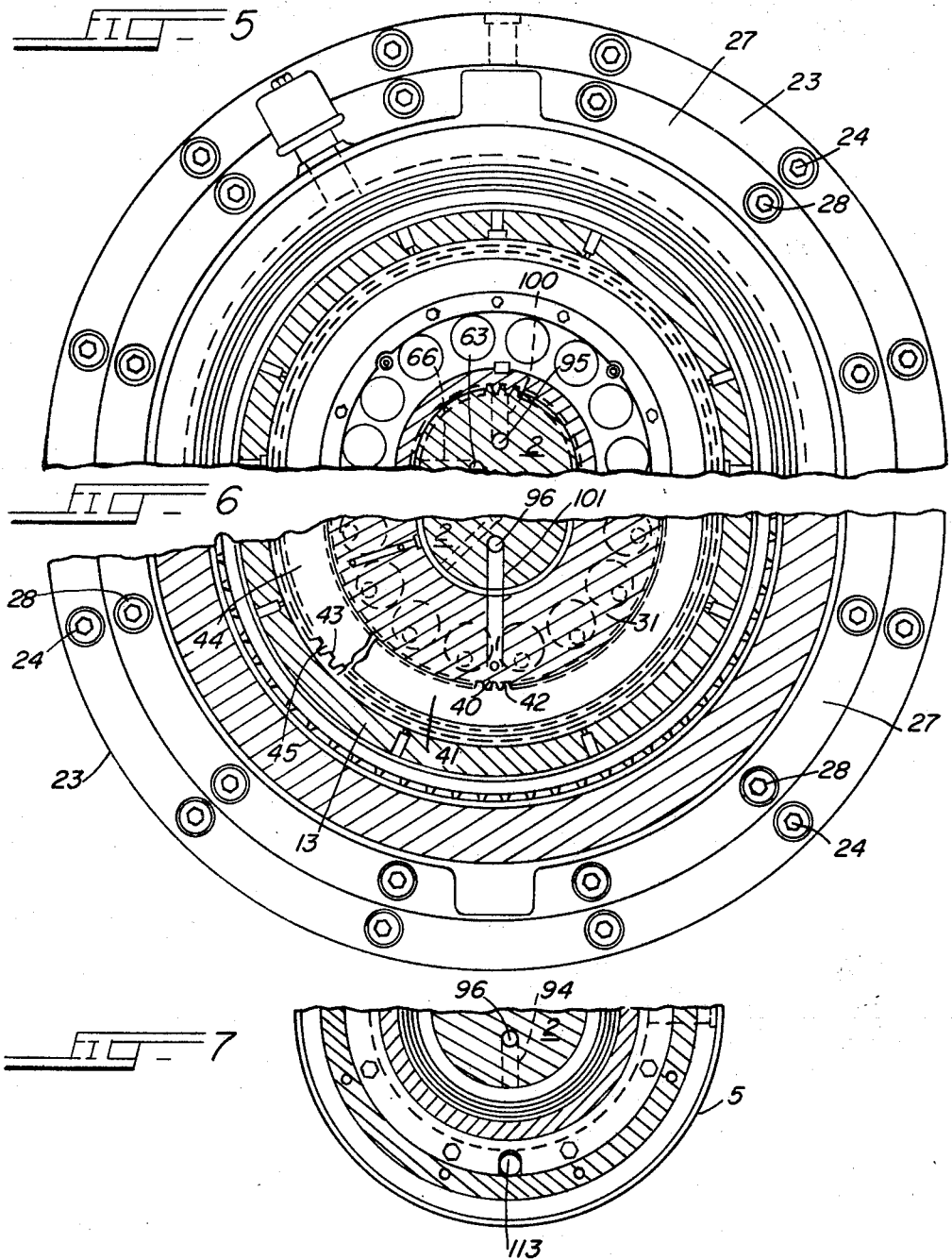

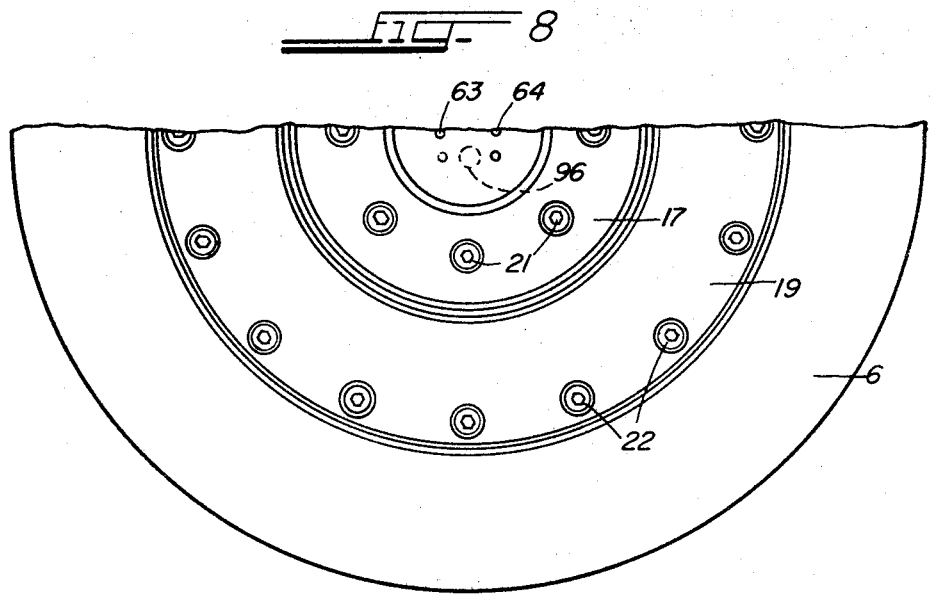
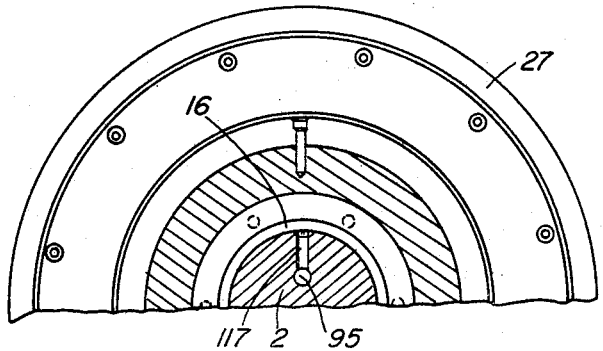

3,494,450
CLUTCH AND BRAKE WITH TELESCOPING PISTONS
Vincent J. Mankowsky, Chicago, and Louis F. Carrieri, La Grange Park, Ill., assignors to U.S. Industries, Inc., New York, N.Y., a corporation of Delaware
Filed Dec. 7, 1966, Ser. No. 599,812
Int. Cl. F16d 13/42, 13/74, 67/02
U.S. Cl. 192—18                                     9 Claims

ABSTRACT OF THE DISCLOSURE

A drive mechanism having brake and clutch discs with piston mechanism, including two telescoping pistons, disposed between said brake and clutch for selectively and simultaneously actuating the brake and clutch.

---

This invention relates to transmissions and, more particularly, to transmissions which are particularly well adapted for use on relatively heavy machinery such as, for example, mechanical metal drawing presses, and the like.

It is a primary object of the present invention to afford a novel transmission.

It is another object of this invention to enable a novel transmission for heavy machinery to be afforded which is in the form of an accessory for such machinery, and which may be quickly and easily removed and replaced.

A transmission unit in the form of an accessory, and which may be used for driving heavy machinery such as, for example, mechanical metal drawing presses, and the like, is shown in the John K. Liu United States Letters Patent No. 3,020,990, issued Feb. 13, 1962. The unit disclosed in that patent is highly practical and has met with much commercial success. It is of a type wherein a drive shaft is driven by a flywheel through a planetary gear system. The present invention enables all gearing to be eliminated in a transmission unit between the flywheel and the drive shaft to be driven thereby.

Other transmissions of the general type to which this invention relates have been heretofore known in the art, but have commonly had several inherent disadvantages such as, for example, being large and cumbersome in size; being subject to accidental actuation; being difficult to cool for prolonged operation; having relatively low limits of maximum speed of rotation of the unit to be driven; or being complicated and difficult to assemble and operate, and the like. It is an important object of the present invention to overcome such disadvantages.

Another object of the present invention is to afford a novel transmission unit embodying a flywheel as a driving unit, wherein the driven portion of the transmission unit may be coupled in a novel and expeditious manner to the flywheel for rotation at the same speed as that of the flywheel.

Yet another object of the present invention is to afford a novel transmission unit of the flywheel-drive type wherein the flywheel may be readily removed and replaced in a novel and expeditious manner.

A further object is to afford a novel transmission unit of the flywheel-drive type wherein flywheels of different weights and sizes may be readily interchanged in a novel and expeditious manner.

Another object is to afford a novel transmission unit which embodies a novel clutch mechanism and a novel brake mechanism, operable in a novel and expeditious manner.

Another object of the present invention is to afford a novel transmission unit embodying a flywheel as a driving unit, and wherein rotation of the flywheel may be controlled in a novel and expeditious manner.

Yet another object is to enable a transmission to be cooled in a novel and expeditious manner.

A further object is to afford a novel transmission unit of relatively large capacity, which is relatively small and compact in size.

Another object is to afford a novel transmission unit which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:
FIG. 1 is a side elevational view of a transmission embodying the principles of the present invention;
FIG. 2 is a longitudinal sectional view of the transmission shown in FIG. 1;
FIG. 3 is a fragmentary detail sectional view taken substantially along the line 3—3 in FIG. 2;
FIG. 4 is a fragmentary detail sectional view taken substantially along the line 4—4 in FIG. 2;
FIG. 5 is a fragmentary detail sectional view taken substantially along the line 5—5 in FIG. 2;
FIG. 6 is a fragmentary detail sectional view taken substantially along the line 6—6 in FIG. 2;
FIG. 7 is a fragmentary detail sectional view taken substantially along the line 7—7 in FIG. 2;
FIG. 8 is a fragmentary detail sectional view taken substantially along the line 8—8 in FIG. 2; and
FIG. 9 is a fragmentary detail sectional view taken substantially along the line 9—9 in FIG. 2.

A transmission unit 1, embodying the principles of the present invention, is shown in the drawings to illustrate the presently preferred embodiment of the present invention.

In general, the transmission unit 1 embodies a drive shaft 2 journalled in suitable bearings 3 and 4 in a suitable supporting frame or housing 5, the drive shaft 2 projecting from opposite ends of the housing 5, FIG. 2. A flywheel 6 is rotatably mounted on the housing 5, in a manner which will be discussed in greater detail presently for rotation therearound. The flywheel 6 is continuously rotated on the housing 5 during operation of the transmission 1. It may be operatively connected to, and disconnected from the drive shaft 2 by a clutch 7, as will be discussed in greater detail presently. A brake 8, mounted in the housing 5, is operable to stop rotation of the drive shaft 2.

The drive shaft 2 embodies a front end portion 9 which projects forwardly from the housing 5. A suitable coupling member 10 is keyed to the front end portion 9 for drivingly connecting the drive shaft 2 to a suitable driven member such as, for example, the drive shaft of a mechanical metal drawing press, or the like, not shown. A suitable combination bearing retainer and oil seal 12 is secured to the front end of the housing 5 between the coupling member 10 and the bearing 3 in position to retain the bearing 3 in operative position in the housing 5 and prevent the leakage of oil forwardly from the housing 5.

The flywheel 6 is rotatably mounted on the housing 5 by means of a hub 13 which is journalled in the rear end portion of the housing 5 by means of suitable bearings 14 and 15, FIG. 2. The hub 13 has two oil seals 16 and 17 mounted thereon in position to prevent the leakage of oil between the hub 13 and the rear end portion 18 of the drive shaft 2. The hub 13 includes an annular flange 19 splined to the main body portion 20 thereof and releasably secured thereto by suitable means such as bolts 21 extending through the seal 17 into the main body portion 20. The flywheel 6 is removably secured on the flange 19 of the hub 13 by suitable means such as bolts 22.

With this construction, the flywheel 6 may be quickly and easily removed and replaced on the transmission unit 1 in the event that it should become damaged during operation. Also, it will be seen that with this construction a flywheel 6 may be quickly and easily removed from the transmission unit 1 and replaced with a flywheel of different size. To accomplish such a replacement of the flywheel 6, the bolts 21 may be removed from the transmission unit 1 and the flywheel 6 and flange 19 may then be pulled off from the body portion 20 of the hub 13. If desired, the flange 19 may then be removed from the flywheel 6, by first removing the bolts 22, and a new flywheel 6 may then be mounted on the flange 19 and secured thereto by the bolts 22. Also, with this construction, if desired, a new flange 19, which is of a different size, may be substituted for the old flange 19 during such a change of flywheel sizes. Thus, with this construction, the driving capacity of the transmission unit 1 may be quickly and easily changed, and this may be accomplished by merely changing the flywheel 6, a supply of different sizes of which may be relatively readily stored.

The housing 5 embodies a radially outwardly projecting flange 23, FIG. 2, and the transmission unit 1 may be secured to a press, or the like, to be driven thereby by suitable means such as bolts 24 extending through the flange 23 into the supporting frame 25, or the like, of the press.

The housing 5 includes a hub 26 projecting forwardly from the flange 23 and preferably formed integrally therewith. The housing 5 also includes a collar or sleeve 27, which is removably mounted on the flange 23 by bolts 28, FIG. 3, and extends rearwardly therefrom. The bearings 3 and 4, by which the drive shaft 2 is journalled in the housing 5 are mounted in the hub portion 26 of the housing 5, and the clutch 7 and brake 8 are mounted in the sleeve 27 of the housing 5. Also, the bearings 14 and 15, by which the hub 13 is journalled in the housing 5 are mounted in the sleeve portion 27 thereof. With this construction, if there should be a bearing seizure of either the bearing 14 or the bearing 15, by which the flywheel 6 is rotatably supported, there is no danger that the drive shaft 2 will be accidentally driven by the flywheel 6 because of such seizure.

An annular hub member 29 is keyed to the drive shaft 2 rearwardly of the flange 23 on the housing 5. A shoulder 30 on the drive shaft 2 spaces the hub member 29 from the flange 23. Similarly, an annular hub member 31 is keyed to the drive shaft 2 forwardly of the oil seal 16 on the hub 13. The hub 31 is held in forwardly spaced relation to the oil seal 16, and in abutting engagement with the rear end of the hub 29 by a retainer ring 32 secured to the drive shaft 2.

Splines 33, FIG. 3, are formed in the outer peripheral edge of the hub 29, and a plurality of annular-shaped brake discs 34, FIG. 2, having splines 35, FIG. 3, formed in the inner peripheral edge portion thereof are slidably mounted on the outer periphery of the hub 29 for free sliding movement axially thereof, with the splines 35 engaged with the splines 33 to thereby operatively connect the brake discs 34 to the hub 29 for rotation therewith.

An annular flange 36, FIGS. 2 and 3, secured to the flange 23 of the housing 5 by suitable means, such as bolts 36a, has splines 37 formed on the inner peripheral surface thereof, and a plurality of annular-shaped brake discs 38 having splines 39 formed in the outer peripheral portion thereof are mounted in the flange 36 for free sliding movement axially thereof, with the splines 37 engaged with the splines 39 to thereby operatively connect the brake discs 38 to the housing 5.

Splines 40 are formed in the outer periphery of the hub 31, FIG. 6, and a plurality of annular-shaped clutch discs 41 having splines 42 formed in the inner peripheral edge portion thereof are slidably mounted on the outer periphery of the hub 31 for free sliding movement axially thereof, with the splines 40 engaged with the splines 42 to thereby operatively connect the clutch discs 41 to the hub member 31 for rotation therewith.

Also, the hub 13, radially outwardly of the clutch 7, has splines 43 formed on the inner peripheral surface thereof, FIG. 6, and a plurality of annular-shaped clutch discs 44 having splines 45 formed on the outer peripheral surface thereof are mounted in the hub 13 for free sliding movement axially thereof, with the splines 43 engaged with the splines 45 to thereby operatively connect the clutch discs 44 to the hub 13 for rotation therewith.

An annular piston assembly 46 is slidably mounted in the rear face of the hub 29 between the hub 29 and the hub 31. The piston assembly 46 embodies a main piston 47 and an auxiliary piston 48 for a purpose which will be discussed in greater detail presently.

The main piston 47 includes a forwardly projecting, annular piston head 49 mounted in an annular cylinder 50 in the hub 29. The piston assembly 46 is reciprocal in the cylinder 50 toward and away from the clutch 7 and the brake 8. A plurality of compression coil springs 51, FIGS. 2 and 4, are mounted in recesses 52 and 53 formed in the main piston 47 and the hub 31, respectively, in position to continually urge the main piston 47 toward the brake 8 and away from the clutch 7.

The auxiliary piston 48 has a forwardly projecting, annular head 54 mounted in an annular cylinder 55 in the main piston 47, the cylinder 55 opening rearwardly toward the clutch 7, FIG. 2. The auxiliary piston 48 has an annular, radially inwardly projecting flange 56 thereon. The flange 56 is disposed rearwardly of the main piston 47, and a bolt 57 extends through the flange 56 and a rearwardly opening recess 58 formed in the main piston 47. A compression coil spring 59 is mounted on the bolt 57 within the recess 58 in position to yieldingly urge the auxiliary piston 48 forwardly in the transmission unit 1 toward the position in which the flange 56 is disposed in abutting engagement with the rear face of the main piston 47, FIG. 2.

As will be discussed in greater detail presently, the piston assembly 46 is adapted to be actuated so as to: (1) engage the brake 8 and disengage the clutch 7, to thereby disengage the flywheel 6 from the drive shaft 2, and hold the drive shaft 2 against rotation; (2) disengage the brake 8 and engage the clutch 7, to thereby connect the flywheel 6 to the drive shaft 2, and release the drive shaft 2 for rotation with the flywheel 6; and (3) engage both the clutch 7 and the brake 8 to thereby apply a braking force to the drive shaft 2 and the flywheel 6.

Actuation of the piston assembly 46 and, therefore, of the clutch 7 and brake 8, may be effected and controlled hydraulically. For this purpose, a double rotary seal 60 is mounted on the rear end 60 of the drive shaft 2. The seal 18 has two inlets 61 and 62 which may be operatively connected to two passageways 63 and 64, FIGS. 2, 3 and 5, extending forwardly through the drive shaft 2. The front end of the passageway 63 is closed by suitable means such as a plug 65. The other passageway 64 terminates at its front end in rearwardly spaced relation to the front end of the drive shaft 2. The inlets 61 and 62 of the rotary seal 60 are connected to the rear ends of the passageways 63 and 64, respectively, and may be connected to any suitable controlled source of hydraulic pressure, not shown.

The passageway 63 is connected by a radially outwardly extending passageway 66, FIGS. 2 and 3, to an annular recess 67 formed in the inner peripheral surface of the hub 29, FIG. 2. Suitable sealing members, such as O-rings 68 and 69 are mounted in the drive shaft 2 on opposite sides of the recess 67 in position to prevent leakage of oil or hydraulic fluid from the passageway 67 axially of the drive shaft 2. The recess 67 is connected by a passageway 70, extending through the hub 29, to the front end of the annular cylinder 50 in the hub 29.

With this construction, when it is desired to actuate the piston assembly 46 from its normal at-rest position, wherein the auxiliary piston 48 is held by the springs 59 in engagement with the rear face of the main piston 47, and the main piston is held in forwardmost position in the cylinder 50, this may be readily accomplished by feeding oil into either the passageway 63 or the passageway 64 from the rotary seal 60.

In its aforementioned normal at-rest position the piston assembly 46 is disposed in forwardly spaced relation to the clutch 7, so that the clutch 7 is disengaged. At this same time, the piston assembly is disposed in such position that the main piston 47 thereof is effective to clamp the brake discs 34 and 48 together between the flange 36 of the housing 5 and the main piston 47 to thereby engage the brake 8. Under these conditions, the flywheel 6 is free to rotate relative to the drive shaft 2, and the drive shaft 2 is held by the brake 8 against rotation.

If it is desired to move the piston assembly 46 from its normal at-rest position into a position wherein it is effective to release the brake 8 and engage the clutch 7, this may be readily accomplished by feeding working fluid inwardly through the inlet 61 of the rotary seal 60, the passageways 64 and 66, the recess 67 and the passageway 70 into the front end of the piston 50 to thereby move the piston assembly 46 rearwardly against the urging of the springs 51 into its rearwardmost position wherein it is disposed in rearwardly spaced relation to the brake discs 34 and 38, to thereby disengage the brake 7; and it is disposed in position to clamp the clutch discs 41 and 44 together between the auxiliary piston 48 and a flange 31a on the hub 31, to thereby engage the clutch 7. This engagement of the clutch 7 and disengagement of the brake 8 is effective to operatively connect the flywheel 6 to the drive shaft 2 and release the latter for rotation by the flywheel.

When it is again desired to disconnect the flywheel 6 from the drive shaft 2, and stop rotation of the drive shaft 2, this may be readily effected by venting the inlet 61 to sump, or the like, and thereby release the hydraulic pressure on the front of the piston head 49 and thereby free the piston assembly 46 for forward movement by the springs 51 back into its aforementioned normal at-rest position wherein it is effective to disengage the clutch 7 and engage the brake 8. This latter actuation of the piston assembly 46, while it is effective to stop rotation of the drive shaft 2, is not effective to stop rotation of the flywheel 6, the latter being left free to rotate on the bearings 14 and 15 carried by the sleeve 27 of the housing 5. Therefore, if it is subsequently desired to drive the drive shaft 2, this may be readily effected by again feeding working fluid inwardly through the inlet 61 to the inner end of the piston 50 to again disengage the brake 8 and engage the clutch 7.

If, at the completion of operation of the transmission unit 1 it is desired to stop the rotation of the flywheel 6, this may be readily accomplished by expanding the piston assembly 46 from its normal at-rest position, to thereby move the auxiliary piston 48 rearwardly relative to the main piston 47 into position to clamp the clutch discs 41 and 44 against the flange 31a on the hub 31. For this purpose, a suitable working fluid such as, for example, oil may be fed from a controlled pressure source, not shown, through the inlet 62 of the rotary seal 60 into the passageway 64 in the drive shaft 2. The inner end of the passageway 64 is connected by a radially outwardly projecting passageway 71 to a groove 72 formed in the outer periphery of the drive shaft 2 in radial alignment with the outer end of a passageway 73 extending through the hub 31 to a recess 74 in the rear face of the hub 31. One end of a tubular connecting member 75 is slidably mounted in the recess 74, and the other end thereof is slidably mounted in a recess 76 formed in the rear face of the main piston 47. The tubular member 75 affords a sliding connection between the interiors of the recesses 74 and 76, and these connections are sealed by suitable sealing members such as O-rings 77 and 78, respectively. The recess 76 is connected by a passageway 79 to the front end of the cylinder 55 in which the auxiliary piston 48 is mounted.

With this construction, when the brake 8 is engaged and the clutch 7 is disengaged during operation of the transmission unit 1, so that the drive shaft 2 is stopped and the flywheel 6 is rotating therearound, if it is desired to stop the rotation of the flywheel 6 this may be readily accomplished by feeding working fluid inwardly through the inlet 62 of the rotary seal 60, the passageways 64 and 71, the annular groove 72, the passageway 73, the tubular connecting member 75 and the passageway 79 into the forward end of the cylinder 55. The hydraulic pressure thus built up in the cylinder 55 is effective to move the auxiliary piston 48 rearwardly therein against the urging of the coil spring 59, and thus extend the auxiliary piston 48 into operative engagement with the clutch 7, to thereby clamp together the discs 41 and 44 thereof. At the same time, the expansion of the piston unit 46 is effective to urge the main piston 47 toward the brake 8, to thereby augment the braking force being applied by the springs 51. With the clutch 7 and the brake 8 thus both engaged, and with the brake 8 more firmly engaged than is the clutch 7, the clutch 7 is effective to operate as a braking unit and effect stopping of rotation between the hub 13 and the sleeve 27 of the housing 5, to thereby stop rotation of the flywheel 6.

The expansion of the piston unit 46 is effective to press the auxiliary piston 48 against the discs 41 and 44 of the clutch 8 with the same force that it presses the main piston 47 against the discs 34 and 48 of the brake 7, so that it applies equal clutch-engaging and brake-applying forces. This braking force augments whatever additional braking force is being applied by the springs 51. Thus, there is no danger that, with the piston assembly 46 being in such a position that the drive shaft 2 is stopped by the brake 8, expansion of the piston assembly 46, and consequent coupling of the flywheel 6 to the drive shaft 2, can be effected to overcome the brake 8 and cause rotation of the drive shaft.

The transmission unit 1 shown in the drawings is of the oil-cooled type, and embodies an oil inlet passageway 81 opening outwardly through the top of the flange 23 of the housing 5, FIG. 2. The passageway 81 may be connected to a suitable source of pressurized lubricating oil, such as, for example, an oil pump, not shown, by a pipe or conduit 82. The oil inlet passageway 81 is connected to a passageway 83 which opens radially inwardly through the inner peripheral surface of the hub 26 on the housing 5 in radial alignment with an annular groove 84 on the outer portion 85 of an annular spacer 86 mounted between the bearings 3 and 4. The inner peripheral surface of the outer portion 85 of the spacer 86 has an annular groove 87 formed therein, and the latter is connected to the groove 84 by passageways 88. The groove 87 is in communication with radially outwardly opening passageways 89 formed in the inner portion 90 of the spacer 86, and these passageways are connected to an annular groove 91 formed in the inner peripheral surface of the inner portion 90 of the spacer 86. The portions 85 and 90 of the spacer 86 have grooves 92 extending longitudinally therethrough so that oil fed into the groove 87 may pass outwardly through the groove 92 into the bearings 3 and 4 for lubricating the latter.

The groove 91 on the inner periphery of the spacer 86 is disposed in axial alignment with passageways 93 and 94 extending radially through the drive shaft 2 into communication with passageways 95 and 96, respectively, which extend axially into the drive shaft 2 from the front end thereof, FIGS. 2 and 8. The passageways 95 and 96 are connected by radially outwardly extending passageways 97 and 98, respectively, to an annular groove 99 formed in the inner peripheral surface of the hub 29; and are connected by radially outwardly extending passageways 100 and 101, respectively, to an annular groove 102 formed in the outer periphery of the drive shaft 2 radially inwardly of the hub 31.

The groove 99 is connected by passageways 103 to passageways 104 in the hub 29 disposed inwardly of the brake discs 34 in substantially parallel relation to the axes thereof. The passageways 104 have a plurality of orifices 105 which project radially outwardly therefrom and open outwardly through the hub 29 between respective pairs of the brake discs 34. Similarly, the groove 102 in the drive shaft 2 is in communication with passageways 106, which are connected to passageways 107 disposed inwardly of the clutch discs 41, with orifices 108 extending outwardly therefrom into communication between respective pairs of clutch discs 41.

An oil discharge opening 109 is formed in the bottom of the sleeve 27 of the housing 5 and may be connected to sump by a suitable discharge conduit 110 to sump.

Oil passageways 111 and 112, in the form of relatively small orifices, extend radially through the hub 13 and afford passageways for the brake and clutch lubricating and cooling oil discharged from the orifices 105 and 108 to flow outwardly through the hub 13 for lubricating the bearing 14. They also afford passageways for oil to pass outwardly through the hub 13 into the sleeve 27 of the housing 5 for discharge through the outlet 109.

The bearing 15 is lubricated by oil which passes the seal 16 and is augmented by controlled flow through the orifice 117 in the driveshaft 2. This flow reaches the bearing 15 through a passage 115 in the hub 13. Two passageways 113 and 114 extend from the outer bearings 3 and 15 of the transmission unit for feeding oil, which passes those bearing, back into the lower portion of the housing 5 for discharge through the oil outlet 109.

In the operation of the transmission unit 1, it may be mounted on a press, or the like, to be driven thereby by the bolts 24 extending through flange 23 of the housing 5, and with the coupling member 10 operatively coupled to the drive shaft of the press. In the normal at-rest condition of the transmission unit 1, the inlets 61 and 62 of the rotary seal 60 are open to sump so that the piston assembly 46 is not subjected to any fluid pressure; the brake 8 is engaged by the force applied by the springs 51, so that the drive shaft 2 is coupled to the housing 5 and held thereby against rotation; and piston assembly 46 is disposed in spaced relation to the clutch 7 so that the clutch 7 is disengaged and the flywheel 6 and the hub 13 are free to rotate on the sleeve 27 of the housing 5 relatively to the housing 5 and the drive shaft 2.

When it is desired to rotate the drive shaft 2 and, therefore, the drive shaft coupled thereto, the flywheel 6 may be caused to rotate by any suitable means, such as, for example, belts, not shown. Thereafter, with the flywheel 6 rotating at the desired speed, working fluid, such as pressurized oil, may be fed from the inlet 61 of the rotary seal 60 into the front end of the cylinder 50 in the hub 29. The working fluid in the cylinder 50 is effective to force the piston assembly 46 rearwardly from the position shown in FIG. 2, wherein the brake 8 is engaged and the clutch 7 is disengaged, to a position wherein the main piston 47 is moved out of engagement with the rearwardmost brake disc 34, and the auxiliary piston 48 is moved into engagement with the forwardmost clutch disc 41. This movement of the piston assembly 46 is effective to free the brake discs 34 and 38 from clamping engagement with each other, to thereby disengage the brake 8 and free the drive shaft 2 for rotation relative to the housing 5; and to clamp clutch discs 41 and 44 into tight frictional engagement with each other and thereby operatively connect the hub 13 and, therefore, the flywheel 6 to the hub 31 keyed to the drive shaft 2 so that the flywheel 6 is effective to rotate the drive shaft 2.

When it is desired to disengage the flywheel 6 from its driving connection with the drive shaft 2, this may be readily accomplished by releasing the pressure in the inlet 61 of the rotary seal 60 to thereby vent the forward end of the cylinder 50 in the hub 29 to sump and free the piston assembly 46 for movement in a forward direction by the springs 51 into position to again engage the brake 8 and to disengage the clutch 7. Under these conditions, the drive shaft 2 is again operatively coupled to the housing 5 and held against rotation, and the flywheel 6 is uncoupled from the drive shaft 2 and, with the hub 13, is free to rotate relative thereto. This procedure may be repeated as often as it is desired to drive and stop the drive shaft 2, and, if desired, the flywheel 6 may be brought up to speed during each time that it is uncoupled from the drive shaft 2 if it is slowed during its previous driving of the drive shaft 2.

If during operation of the transmission unit 1 it is desired to stop rotation of the flywheel 6, this may be readily accomplished when the brake 8 is engaged by the action of the springs 51, by feeding working fluid, such as pressurized oil, from the inlet 62 of the rotary seal 60 into the cylinder 55 in the main piston 47 of the piston assembly 46. The working fluid thus fed into the cylinder 55 is effective to overcome the urging of the compression coil springs 59, which normally hold the main piston 47 and the auxiliary piston 48 in fully retracted position relative to each other, and thereby move the main piston 47 and the auxiliary piston 48 into extended position relative to each other, wherein the auxiliary piston 48 engages the forwardmost clutch disc 41 and is effective to clamp the clutch discs 41 and 44 together to thereby couple the flywheel 6 to the drive shaft 2. It will be remembered that when this engagement of the clutch 7 is effected by expansion of the piston assembly 46, the brake 8 is already engaged by reason of the action of the springs 51 thereon. The expansion of the piston assembly 46 is not only effective to move the auxiliary piston 48 into position wherein it applies a clamping force to the clutch discs 41 and 44, but it also causes the main piston 47 to be pressed against the rearwardmost brake disc 34 with the same force, to thereby afford a clamping force to the brake discs 34 and 38 which augments the already existing clamping force thereon effected by the springs 51. Inasmuch as the forces applied by the piston assembly 46 to the brake 8 and the clutch 7 by reason of the expansion of the piston assembly 46, are equal, and the force applied thereby to the brake 8 augments an already existing braking force applied by the action of the springs 51, the engagement of the clutch 7 is not effective to overpower the brake 8. Therefore, there is no danger in the operation of the transmission unit 1 that the braking of the flywheel 6 will cause accidental rotation of the drive shaft 2.

After the rotation of the flywheel 6 has thus been stopped, the inlet 62 of the rotary seal 60 may be opened to sump to thereby release the pressure in the cylinder 55 and free the main piston 47 and the auxiliary piston 48 to the action of the springs 59. The retraction of the piston assembly 46 by the springs 59 is effective to again move the auxiliary piston 48 out of engagement with the clutch 7 and thereby disengage the clutch 7 so that the transmission unit 1 is disposed in its aforementioned normal at-rest condition.

In the preferred form of the transmission unit 1, the oil for cooling and lubricating the unit is fed in through the inlet 82 and out through the outlet 110 at such a rate that the oil level in the housing 5 is below the hub 13, the oil fed under pressure to the various parts to be cooled and lubricated being relied upon to afford the cooling and lubrication thereof. With this operation, the hub 13 and the other rotating parts in the transmission unit 1 are not rotating in a bath of oil, and therefore are not subjected to the drag which is afforded by such a bath.

However, as will be appreciated by those skilled in the art, such lubrication and cooling of the transmission unit 1 is merely the preferred method of doing so, and the present invention is not limited thereto. If desired, the passageways, through which oil is fed into the housing 5 in the preferred form of the present invention, may be enlarged, and other passageways may be opened so as to afford a bath of oil in the housing 5, and in which the hub 13 and other rotating parts rotate, without departing from the purview of the present invention. The transmission unit 1 is so constructed that, if desired, a bath of oil may be afforded in the housing 5, which extends upwardly to a relatively high level, such as, for example above the lower edge of the drive shaft 2, without affording objectionable leakage of oil from the transmission unit 1.

From the foregoing it will be seen that the present invention affords a novel transmission unit wherein the driving member and the driven member thereof may be quickly and easily coupled to and uncoupled from each other.

Also, it will be seen that the present invention affords a novel transmission unit wherein the rotation of a driving unit, such as a flywheel, or the like, may be stopped in a novel and expeditious manner.

In addition, it will be seen that the present invention affords a novel transmission unit wherein the rotating parts therefore do not wish to be limited to the precise details tively small outside diameter.

Also, it will be seen that the present invention affords a novel transmission unit of the flywheel type wherein the flywheel may be removed and replaced, and flywheels may be interchanged, in a novel and expeditious manner.

Also, it will be seen that the present invention affords a novel transmission unit which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A drive mechanism comprising:
 (a) supporting means,
 (b) driven means rotatably mounted in said supporting means,
 (c) driving means rotatably mounted on said supporting means,
 (d) clutch means for operatively connecting said driving means to said driven means for rotating the latter,
 (e) brake means for stopping rotation of said driven means,
 (f) means for simultaneously engaging said clutch means and releasing said brake means to thereby cause said driven means to be driven by said driving means during rotation of the latter,
 (g) means for simultaneously engaging said clutch means and applying an engaging force to said brake means for stopping rotation of said driving means,
 (h) said means for simultaneously engaging said clutch means and applying an engaging force to said brake means comprising:
  (1) a piston disposed between said clutch and brake means and movable into operable engagement with said brake means, and
  (2) another piston carried by said first mentioned piston between said clutch and brake means and movable into operative engagement with said clutch means,
 (i) said other piston being movable relative to said first mentioned piston toward and away from said clutch means, and
 (j) means operatively connected between said first mentioned and said other piston for yieldingly urging said other piston away from said clutch means.

2. A transmission as defined in claim 1, and in which:
 (a) said supporting means comprises a housing,
 (b) said driven means comprises a drive shaft rotatably mounted in said housing, and
 (c) said driving means comprises:
  (1) a hub journalled in said housing for rotation therein outwardly of said drive shaft, and
  (2) a flywheel disposed axially outwardly of said housing and connected to said hub for rotation with the latter.

3. A transmission as defined in claim 2, and in which:
 (a) said flywheel is removably mounted on said hub.

4. A transmission as defined in claim 2, and in which:
 (a) said brake means comprises:
  (1) brake discs operatively connected to said housing, and
  (2) other brake discs operatively connected to said drive shaft and movable into and out of engagement with said first mentioned brake discs, and
 (b) said clutch means comprises:
  (1) clutch discs operatively connected to said hub, and
  (2) other clutch discs operatively connected to said drive shaft and movable into and out of engagement with said first mentioned clutch discs.

5. A transmission comprising:
 (a) a housing,
 (b) driven means rotatably mounted in said housing,
 (c) driving means rotatably mounted in said housing for rotation relative thereto,
 (d) brake means disposed between said housing and said driven means for holding said driven means against rotation,
 (e) clutch means disposed between said driven means and said driving means for connecting said driven means to said driving means for rotation thereby, and
 (f) actuating means disposed between said brake means and said clutch means for selectively:
  (1) engaging said brake means and disengaging said clutch means to thereby hold said driven means against rotation and free said driving means for rotation relative to said driven means,
  (2) engaging said clutch means and disengaging said brake means to thereby operatively connect said driving means to said driven means and free said driven means for rotation by said driving means, and
  (3) simultaneously engaging said clutch means and said brake means to thereby operatively connect said driving means to said driven means and hold said driven means against rotation and thereby hold said driving means against rotation,
 (g) said driven means comprising a drive shaft rotatably mounted in said housing, (h) said driving means comprising:
  (1) a hub journalled in said housing for rotation therein outwardly of said drive shaft, and
  (2) a flywheel disposed axially outwardly of said housing and connected to said hub for rotation with the latter,
(i) said brake means comprising
  (1) brake discs operatively connected to said housing, and
  (2) other brake discs operatively connected to said drive shaft and movable into and out of engagement with said first mentioned brake discs, and
(j) said clutch means comprising:
  (1) clutch discs operatively connected to said hub, and
  (2) other clutch discs operatively connected to said drive shaft and movable into and out of engagement with said first mentioned clutch discs,
(k) brake and clutch discs being disposed within said hub.

6. A transmission comprising:
(a) a housing,
(b) driven means rotatably mounted in said housing,
(c) driving means rotatably mounted in said housing for rotation relative thereto,
(d) brake means disposed between said housing and said driven means for holding said driven means against rotation,
(e) clutch means disposed between said driven means and said driving means for connecting said driven means to said driving means for rotation thereby, and
(f) actuating means disposed between said brake means and said clutch means for selectively:
  (1) engaging said brake means and disengaging said clutch means to thereby hold said driven means against rotation and free said driving means for rotation relative to said driven means,
  (2) engaging said clutch means and disengaging said brake means to thereby operatively connect said driving means to said driven means and free said driven means for rotation by said driving means, and
  (3) simultaneously engaging said clutch means and said brake means to thereby operatively connect said driving means to said driven means and hold said driven means against rotation and thereby hold said driving means against rotation,
(g) said driven means comprising a drive shaft rotatably mounted in said housing,
(h) said driving means comprising:
  (1) a hub journalled in said housing for rotation therein outwardly of said drive shaft, and
  (2) a flywheel disposed axially outwardly of said housing and connected to said hub for rotation with the latter,
(i) said brake means comprising:
  (1) brake discs operatively connected to said housing, and
  (2) other brake discs operatively connected to said drive shaft and movable into and out of engagement with said first mentioned brake discs, and
(j) said clutch means comprising:
  (1) clutch discs operatively connected to said hub, and
  (2) other clutch discs operatively connected to said drive shaft and movable into and out of engagement with said first mentioned clutch discs,
(k) said actuating means including:
  (1) a piston assembly comprising:
    (a′) two pistons in telescopic relation to each other for reciprocation between a retracted position and an extended position relative to each other, and
    (b′) spring means operatively connected to said pistons and yieldingly urging said pistons toward said retracted position,
  (2) other spring means operatively connected to said drive shaft and said piston assembly for yieldingly urging said piston assembly as a unit out of engagement with said clutch means and into engagement with said other brake discs to thereby clamp said first mentioned brake discs and other brake discs together and thereby disengage said clutch means and engage said brake means, and
  (3) means for feeding working fluid into engagement with said piston assembly in position to move said piston assembly as a unit against the urging of said spring means out of engagement with said other brake discs and into engagement with said other clutch discs to thereby clamp said first mentioned clutch discs and said other clutch discs together and thereby disengage said brake means and engage said clutch means.

7. A transmission as defined in claim 6, and in which:
(a) said actuating means includes:
  (1) means for feeding working fluid between said pistons in position to move said pistons to said extended position when said piston assembly is disposed in said position wherein said brake means are engaged and said clutch means are disengaged to thereby move one of said pistons into engagement with said other clutch discs effective to clamp said first mentioned clutch discs and said other clutch discs together and thereby engage said clutch means and augment said engagement of said brake means.

8. A transmission as defined in claim 7, and in which:
(a) said means for feeding working fluid into engagement with said piston assembly, and said means for feeding working fluid between said pistons, includes passageways in said drive shaft.

9. A transmission as defined in claim 6, and
(a) in which:
  (1) brake and clutch discs are disposed in said hub,
  (2) said piston assembly and said first mentioned and second mentioned spring means are disposed in said hub and are connected to said drive shaft for rotation therewith, and
(b) which includes:
  (1) means for feeding oil through said drive shaft, into engagement with all of said discs and then into said housing outwardly of said hub, and
  (2) means for discharging oil from said housing.

References Cited
UNITED STATES PATENTS

| | | | |
|---|---|---|---|
| 3,349,879 | 10/1967 | Stuart et al. | 192—18.1 |
| 2,669,333 | 2/1954 | Johnson | 192—18.1 X |
| 2,785,781 | 3/1957 | Johansen. | |
| 3,020,990 | 2/1962 | Liv | 192—12.1 X |
| 3,250,353 | 5/1966 | Liszewski et al. | 192—18.1 |

BENJAMIN W. WYCHE III, Primary Examiner

U.S. Cl. X.R.

188—170; 192—109, 113

PO-1050
(5/69)

UNITED STATES PATENT OFFICE
CERTIFICATE OF CORRECTION

Patent No. 3,494,450     Dated February 10, 1970

Inventor(s) Vincent J. Mankowsky and Louis F. Carrieri

It is certified that error appears in the above-identified patent and that said Letters Patent are hereby corrected as shown below:

Column 9, line 40, cancel "therefore do not wish to be limited to the precise details" and insert -- thereof are disposed in a relatively compact area of rela- --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents